(12) United States Patent
Okada et al.

(10) Patent No.: US 7,565,945 B2
(45) Date of Patent: Jul. 28, 2009

(54) ROUGH-TERRAIN TRAVELING VEHICLE PROVIDED WITH ELECTRICALLY-DRIVEN POWER STEERING APPARATUS

(75) Inventors: Megumu Okada, Saitama (JP); Keita Yagi, Saitama (JP); Kihoko Kaita, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 522 days.

(21) Appl. No.: 11/377,447

(22) Filed: Mar. 17, 2006

(65) Prior Publication Data
US 2006/0207825 A1    Sep. 21, 2006

(30) Foreign Application Priority Data
Mar. 18, 2005    (JP)    ............... 2005-080124

(51) Int. Cl.
*B62D 5/04*    (2006.01)

(52) U.S. Cl. .................. 180/444; 180/443; 280/779; 280/780

(58) Field of Classification Search .................. 180/443, 180/444; 280/779, 780; 248/62
See application file for complete search history.

(56) References Cited

U.S. PATENT DOCUMENTS

| 5,253,730 A | * | 10/1993 | Hayashi et al. | ............ | 180/426 |
| 6,966,399 B2 | * | 11/2005 | Tanigaki et al. | ............ | 180/444 |
| 2004/0050615 A1 | * | 3/2004 | Tatewaki et al. | ............ | 180/444 |

FOREIGN PATENT DOCUMENTS

JP    2004-231011 A    8/2004

* cited by examiner

*Primary Examiner*—Paul N Dickson
*Assistant Examiner*—Jacob Knutson
(74) *Attorney, Agent, or Firm*—Birch, Stewart, Kolasch & Birch, LLP (57) ABSTRACT

To constrain a load applied to a steering shaft and a power assist unit. In a rough terrain vehicle including a power assist unit including an electrically-driven power steering apparatus provided coaxially with a steering shaft, and an electrically-driven motor provided in the power assist unit arranged so as to be orthogonal to the steering shaft, a rear end portion of the electrically-driven motor is supported by a motor supporting member which is mounted to inclined frames of a vehicle body frame.

16 Claims, 5 Drawing Sheets

ROUGH-TERRAIN TRAVELING VEHICLE PROVIDED WITH ELECTRICALLY-DRIVEN POWER STEERING APPARATUS

CROSS-REFERENCE TO RELATED APPLICATIONS

The present application claims priority under 35 USC 119 to Japanese Patent Application No. 2005-080124 filed on Mar. 18, 2005 the entire contents of which are hereby incorporated by reference.

1. Field of the Invention

The present invention relates to an improved rough terrain vehicle provided with an electrically-driven power steering apparatus.

2. Description of Background Art

A rough terrain vehicle that is provided with an electrically-driven power steering apparatus with a drive motor being arranged so as to be orthogonal to a steering shaft is disclosed in JP-A-2004-231011.

Figure 3:
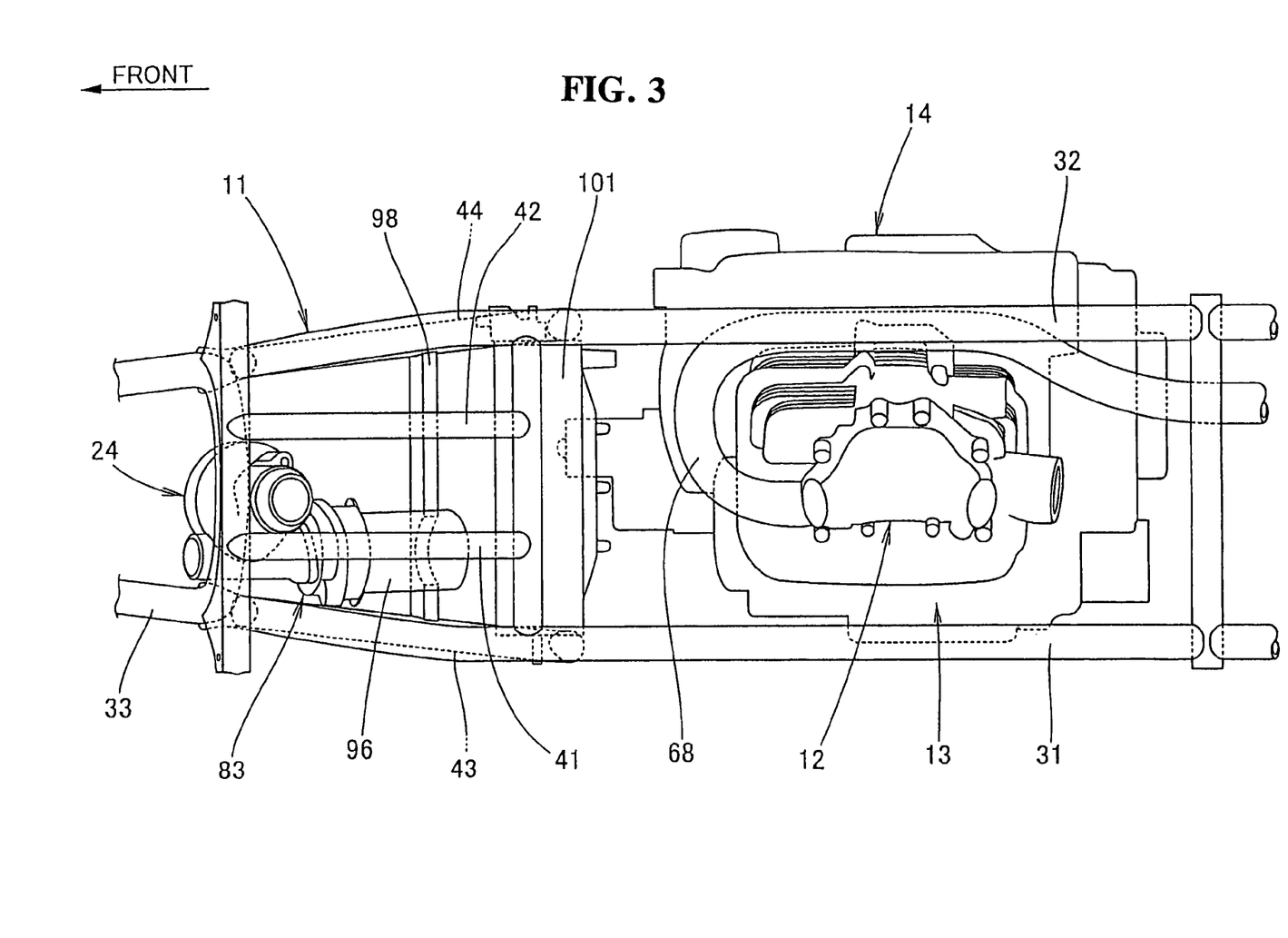
FIG. 3 is a plan view of the principal portion of the rough terrain vehicle according to the present invention.
Figure 4:
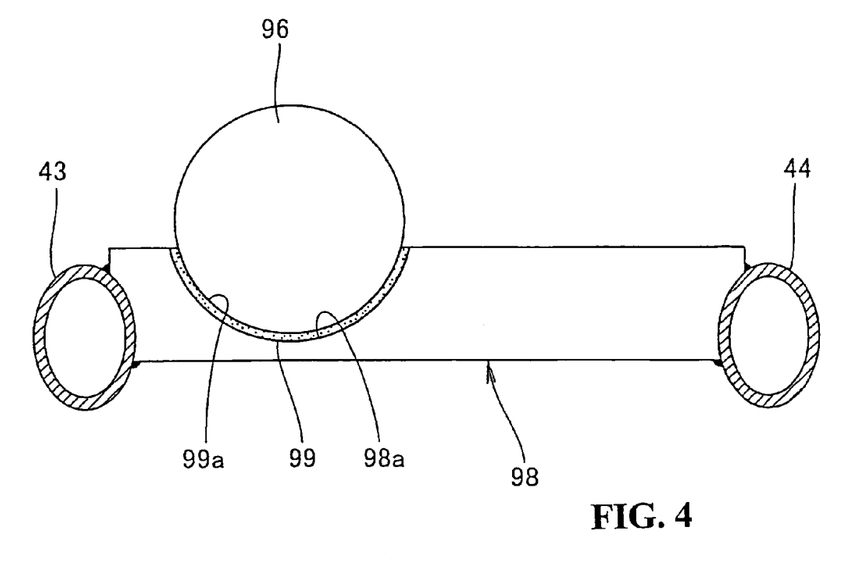
FIG. 4 is a cross-sectional view taken along the line 4-4 in FIG. 2.

In FIGS. 3 and 4 of JP-A-2004-231011, a drive motor 60 is illustrated wherein an electrically-driven power steering apparatus is arranged in such a manner that an output shaft 60b is directed at a right angle with respect to an axial line of a steering shaft 50 and the output shaft 60b extends substantially widthwise of the vehicle on the front side of the steering shaft 50 in a plan view.

In the electrically-driven power steering apparatus described above, since the drive motor 60, which is a heavy member provided in an actuator unit, projects in substantially a sideways direction of the vehicle, for example, when the vehicle travels on rough terrain, the drive motor 60 vibrates. Thus, a repeating load applied to the actuator unit or the steering shaft 50 may increase.

SUMMARY AND OBJECTS OF THE INVENTION

It is an object of the present invention to improve a vehicle for operating on rough terrain that is provided with an electrically-driven power steering apparatus wherein a load applied to a steering shaft and an actuator is reduced.

According to an embodiment of the present invention, a rough terrain vehicle includes an actuator unit which constitutes an electrically-driven power steering apparatus that is provided coaxially with a steering shaft, and an electrically-driven motor provided in the actuator unit and arranged so as to be orthogonal to the steering shaft. An end portion of the electrically-driven motor is supported by a motor supporting member mounted to a vehicle body frame.

The end portion of the electrically-driven motor provided in the actuator unit is supported by the motor supporting member so that vibrations of the electrically-driven motor as a heavy member are reduced.

According to an embodiment of the present invention, the electrically-driven motor is supported by the motor supporting member via a elastic member.

The vibrations of the electrically-driven motor can be absorbed by the elastic member between the motor supporting member and the electrically-driven motor.

According to an embodiment of the present invention, the motor supporting member is formed of a elastic member.

The vibrations of the electrically-driven motor can be absorbed by the motor supporting member formed of the elastic member.

According to an embodiment of the present invention, a cross member for connecting left and right portions of the vehicle body frame is employed as the motor supporting member.

The electrically-driven motor can be firmly supported by the motor supporting member which connects the left and right portions of the vehicle body frame. Thus, the vibrations of the electrically-driven motor can further be reduced, and rigidity of the vehicle body frame can be increased.

According to an embodiment of the present invention, the motor supporting member is configured by tightening a lower motor supporting member for supporting a lower portion of the end portion of the electric motor, and an upper motor supporting member for supporting an upper portion of the end portion of the electric motor.

The electrically-driven motor is firmly supported by the motor supporting member that includes the lower motor supporting member and the upper motor supporting member that are tightened together.

According to an embodiment of the present invention, a cantilevered member extends inwardly of the vehicle body from any one of the left and right vehicle body frames and is employed as the motor supporting member.

By employing the cantilevered structure extending inwardly of the vehicle body from one of the left and right vehicle body frames as the motor supporting member, the length of the motor supporting member is reduced, and the weight of the motor supporting member is also reduced. For example, when the motor supporting member is hung across the left and right vehicle body frames, the rigidity of the vehicle body frame can be increased. However, when the motor supporting member is mounted to one of the vehicle body frames, an excessive increase of rigidity of the vehicle body frame is constrained.

According to an embodiment of the present invention, since the end portion of the electrically-driven motor is supported by the motor supporting member, vibrations of the electrically-driven motor can be reduced, and a large repeated load is not applied to the steering shaft and the actuator unit, so that the influence to the electrically-driven power steering apparatus in terms of strength can be eliminated.

According to an embodiment of the present invention, since the electrically-driven motor is supported via the elastic member, vibrations of the electrically-driven motor can be absorbed by the elastic member. Thus, the repeated load applied to the steering shaft and the actuator unit can further be reduced.

According to an embodiment of the present invention, since the motor supporting member is formed of the elastic member, the vibrations of the electrically-driven motor can be absorbed by the motor supporting member. Thus, an additional elastic member is not necessary, whereby the cost can be reduced.

According to an embodiment of the present invention, since the cross member connecting the left and right vehicle body frames is employed as the motor supporting member, the electrically-driven motor can be firmly supported by the motor supporting member, and the repeated load applied to the steering shaft and the actuator unit can further be reduced.

In addition, since the motor supporting member serves as the cross member for the vehicle body frame, the rigidity of the vehicle body frame can be increased, and the vibrations of the vehicle body frame can also be reduced.

According to an embodiment of the present invention, since the motor supporting member includes the lower motor supporting member and the upper motor supporting member that are tightened to each other, the electrically-driven motor can be firmly supported by the motor supporting member, and the repeated load applied to the steering shaft and the actuator unit can further be reduced.

According to an embodiment of the present invention, since the cantilevered member is employed as the motor supporting member, the weight of the motor supporting member can be reduced and, when the motor supporting member is mounted to the vehicle body frame, an increase in the rigidity of the vehicle body frame is constrained. Thus, an excessive increase in the rigidity of the vehicle body frame is prevented.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Referring now to the drawings, a best mode for carrying out the present invention will be described below. The drawings are to be viewed in the orientation in which reference numerals are arranged.

Figure 1:
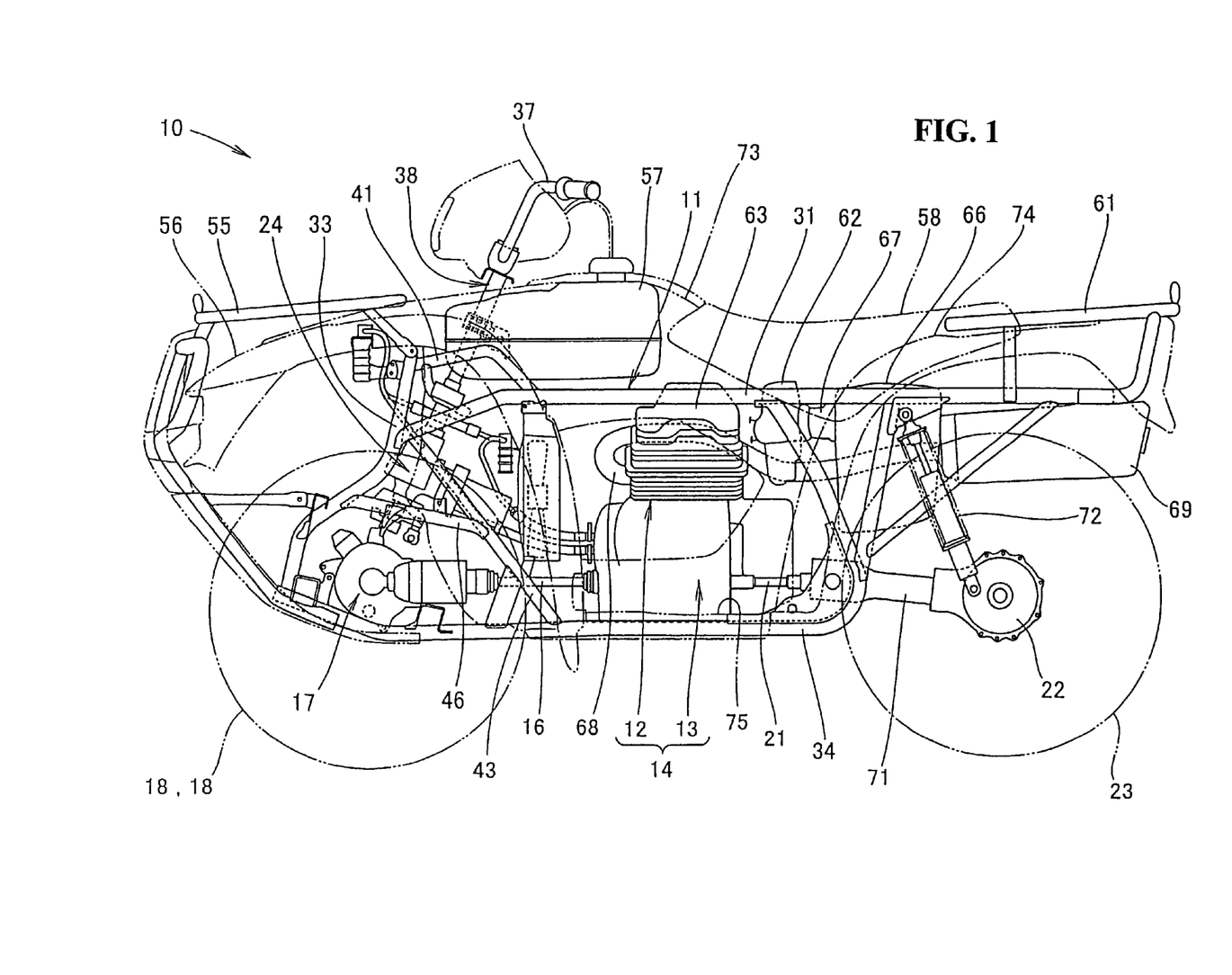
FIG. 1 is a side view of a rough terrain vehicle provided with an electrically-driven power steering apparatus according to the present invention.

FIG. 1 is a side view of a rough terrain vehicle provided with an electrically-driven power steering apparatus according to a first embodiment of the present invention. A rough terrain vehicle 10 is a four-wheel vehicle provided with an electrically-driven power steering apparatus 24 including a power unit 14 having an engine 12 and a transmission 13 mounted at a center of a vehicle body 11. A front final reduction gear 17 is connected to a front portion of the transmission 13 via a front propeller shaft 16. Left and right front wheels 18, 18 are connected to the front final reduction gear 17 via a drive shaft, not shown with a rear final reduction gear 22 connected to a rear portion of the transmission 13 via a rear propeller shaft 21. Left and right rear wheels 23, 23 are connected to the rear final reduction gear 22 via a drive shaft, not shown, so that a steering force for steering the front wheels 18, 18 is reduced.

The vehicle body frame 11 includes a pair of left and right upper main frames 31, 32 (only the reference numeral 31 on the near side is shown) extending in the fore-and-aft direction. An inverted U-shaped front frame 33 in front view connected is connected to front ends of the upper main frames 31, 32 with a pair of left and right lower main frames 34, 36 (only the reference numeral 34 on the near side is shown) being connected, respectively, to a lower end of the front frame 33 and midsections of the upper main frames 31, 32. A pair of left and right angular C-shaped front upper frames 41, 42 (only the reference numeral 41 on the near side is shown) are connected, respectively, to an upper end of the front frame 33 and the upper main frames 31, 32 for rotatably supporting an upper portion of the steering shaft 38 having a handle 37 attached to an upper end thereof. A pair of left and right inclined frames 43, 44 (only the reference numeral 43 on the near side is shown) extend from front ends of the upper main frames 31, 32 rearwardly and downwardly and are connected to the lower main frames 34, 36, and a pair of left and right sub-inclined frames 46, 47 (only the reference numeral 46 on the near side is shown) for supporting a lower portion of the electrically-driven power steering apparatus 24 by being hung across and connected to midsections of the inclined frames 43, 44 and the front frame 33.

A front carrier 55 is connected to a front fender 56 for covering an upper side and a rear side of the front wheel 18. A fuel tank 57 is provided adjacent to a seat 58 with a rear carrier 61 being mounted behind the seat 58. A carburetor 62 is connected to the rear side of a cylinder head 63 of the engine 12 with an air cleaner 66 connected to the carburetor 62 via a connecting tube 67. An exhaust pipe 68 extends from a front portion of the cylinder head 63 toward the rear of the vehicle with a muffler 69 connected to a rear end of the exhaust pipe 68. A swing arm 71 is provided for swingably supporting the rear wheels 23, 23 on the lower main frames 34, 36 with a pair of left and right rear shock absorbers 72, 72 (only the reference numeral 72 on the near side is shown) hung across and connected to the swing arm 71 and the upper main frames 31, 32. A body side cover 73 is arranged on the side of the power unit 14 with a rear fender 74 for covering a front side and an upper side of the rear wheel 23 and a step floor 75 being mounted adjacent to a lower portion.

Figure 2:
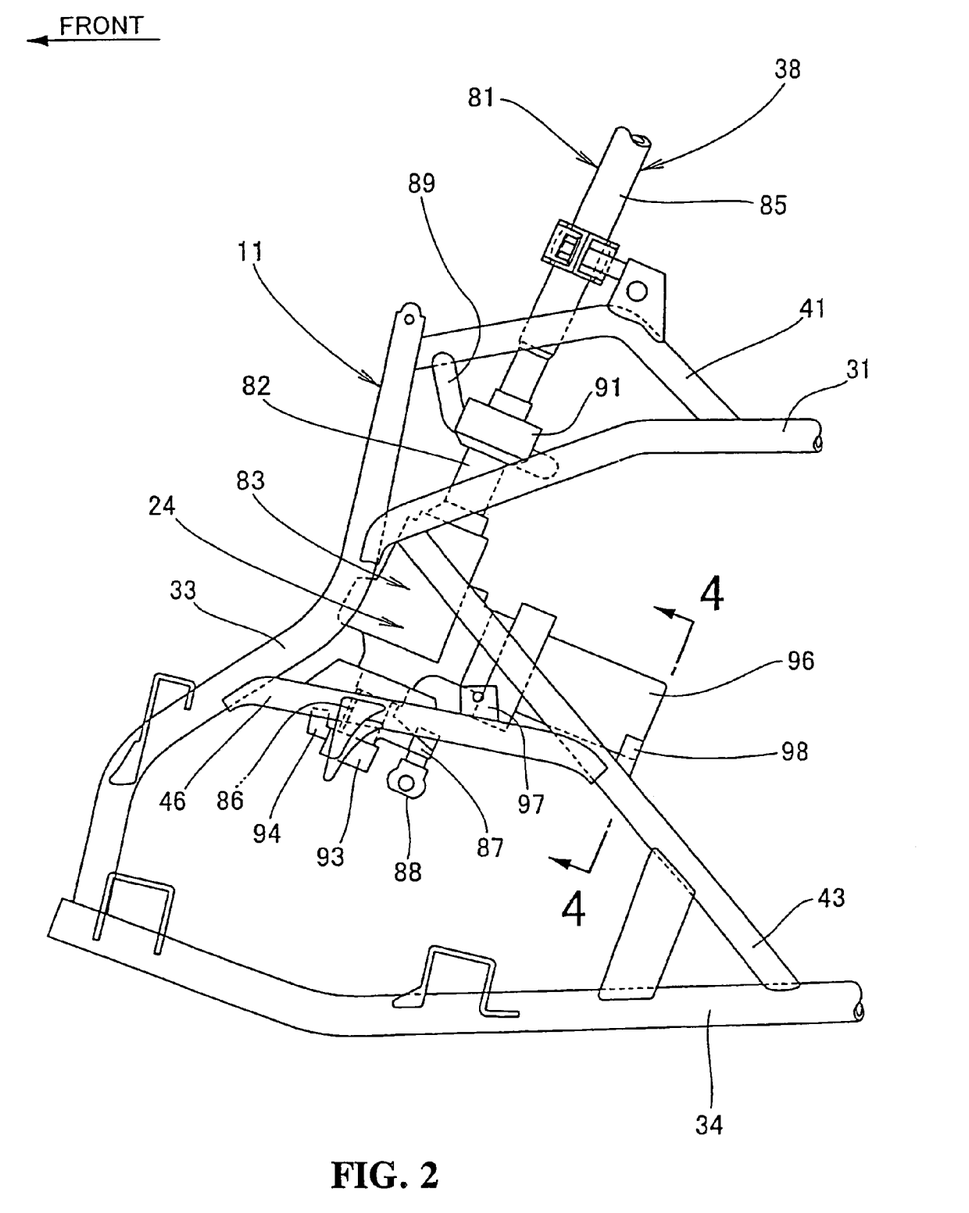
FIG. 2 is a side view of a principal portion of the rough terrain vehicle according to the present invention.

FIG. 2 is a side view of a principal portion of the rough terrain vehicle according to the first embodiment of the present invention (an arrow in the drawing that is marked "FRONT" represents a front of the vehicle, hereinafter). The electrically-driven power steering apparatus 24 includes a steering apparatus 81 for steering the front wheel with a torque sensor unit 82 for detecting a steering torque, a power assist unit 83 for generating power for aiding a steering force, and a control unit, not shown, for controlling the power assist unit 83 based on a steering torque or the like detected by the torque sensor unit 82.

The steering apparatus 81 includes the handle 37 (see FIG. 1), an input shaft 85 for supporting the handle 37, an output shaft 86 connected to the input shaft 85 via the torque sensor unit 82, a steering arm 87 mounted to a lower end portion of the output shaft 86, a pair of left and right ball joints 88, 88 (only the reference numeral 88 on the near side is shown) mounted to the steering arm 87, and a pair of left and right tie rods (not shown) connected at respective one ends to the ball joint 88, 88 and at the other ends to knuckles (not shown) on the front wheels 18 side (see FIG. 1). The input shaft 85 and the output shaft 86 are members that constitute the steering shaft 38.

The input shaft 85 is supported by an intermediate bearing unit 91 mounted to sub-upper frames 89, 89, only the reference numeral 89 on the near side is shown. The sub-upper frames 89, 89 are members hung across the front upper frames 41, 42, only the reference numeral 41 on the near side is shown, and the upper frames 31, 32, only the reference numeral 31 on the near side is shown, respectively.

The output shaft 86 is a member provided with a steering angle sensor 93 for detecting a steering angle (that is, a rotational angle of the steering shaft 38) at a distal end thereof, and the steering angle sensor 93 is a member mounted to the sub-inclined frames 46, 47 (only the reference numeral 46 on the near side is shown) via a bracket 94.

The torque sensor unit 82 is a member provided with a torsion bar (not shown) between the input shaft 85 side and the output shaft 86 side.

When the input shaft 85 is rotated by the operation of the handle (see FIG. 1), a relative rotational angle is generated between the input shaft 85 and the output shaft 86, and the torsion bar is twisted. By converting the twisted amount into a torque, a steering torque is obtained.

The power assist unit 83 is a member composed of an electrically-driven motor 96, a clutch (not shown) interposed between an output shaft of the electrically-driven motor 96 and the output shaft 86 and a speed reducer (not shown, including a worm gear and a worm wheel).

The electrically-driven motor 96 is a member mounted at the front end portion side thereof (the side of the output shaft 86) to motor brackets 97, 97 (only the reference numeral 97 on the near side is shown) provided on the sub-inclined frames 46, 47, and supported at the rear end portion side thereof by a motor supporting member 98 which is hung across and connected to the left and right inclined frames 43, 44 (only the reference numeral 43 on the near side is shown).

The control unit controls the power assist unit 83 based on the steering torque detected by the torque sensor unit 82, the steering angle detected by the steering angle sensor 93, and the vehicle speed of the rough terrain vehicle 10 (see FIG. 1).

FIG. 3 is a plan view of the principal portion of the rough terrain vehicle according to the first embodiment of the present invention showing that an air-cooling fan 101 is arranged rearwardly of the electrically-driven motor 96, and forwardly of the engine 12 and the exhaust pipe 68. A rear end portion of the electrically-driven motor 96 is supported by the motor supporting member 98 hung across the left and right inclined frames 43, 44.

The motor supporting member 98 is a member that also serves as a cross member of the vehicle body frame 11.

The electrically-driven motor 96 is completely shielded between the engine 12 and the exhaust pipe 68 by the air-cooling fan 101. Therefore, by arranging the electrically-driven motor 96 so as to extend substantially rearwardly of the vehicle, the possibility that heat from the engine 12 and the exhaust pipe 68 is radiated directly onto the electrically-driven motor 96 is eliminated even when the distance of the electrically-driven motor 96 with respect to the engine 12 and the exhaust pipe 68 is reduced.

Since the rear end portion of the electrically-driven motor 96 is supported by the motor supporting member 98, the rear end portion of the electrically-driven motor 96 hardly vibrates. More specifically, a large repeated load can hardly be applied to the power assist unit 83 at a root portion of the electrically-driven motor 96.

FIG. 4 is a cross-sectional view taken along the line 4-4 in FIG. 2 of the first embodiment showing that the motor supporting member 98 is hung across the left and right inclined frames 43, 44, a rubber 99 as a elastic member and is adhered to an arcuate recess 98a formed on the motor supporting member 98. The rear end portion of the electrically-driven motor 96 is placed on a recess 99a formed by the rubber 99.

As described above, by supporting the electrically-driven motor 96 on the motor supporting member 98 via the rubber 99, vibrations of the electrically-driven motor 96 can be absorbed by the rubber 99.

By supporting the rear end portion of the electrically-driven motor 96 placed on the recess 99a, the electrically-driven motor 96 can be supported in the horizontal direction (that is, positioning and absorption of vibrations) in addition to the vertical direction.

As shown in FIG. 2 to FIG. 4, the present invention is firstly characterized in that, in the rough terrain vehicle 10 (see FIG. 1) including the power assist unit 83 as an actuator unit which constitutes the electrically-driven power steering apparatus 24 provided coaxially with the steering shaft 38, and the electrically-driven motor 96 provided in the power assist unit 83 arranged so as to be orthogonal to the steering shaft 38, the rear end portion of the electrically-driven motor 96 is supported by the motor supporting member 98 mounted to the vehicle body frame 11.

Since the rear end portion of the electrically-driven motor 96 is supported by the motor supporting member 98, vibrations of the electrically-driven motor 96 can be reduced, and the steering shaft 38 and the power assist unit 83 are prevented from being applied with a large repeated load, whereby an influence to the electrically-driven power steering apparatus 24 in terms of strength can be eliminated.

The present invention is secondly characterized in that the electrically-driven motor 96 is supported by the motor supporting member 98 via the rubber 99 as the elastic member.

Since the electrically-driven motor 96 is supported via the rubber 99, vibrations of the electrically-driven motor 96 can be absorbed by the rubber 99, and the repeated load applied to the steering shaft 38 and the power assist unit 83 can be further reduced.

The present invention may thirdly be configured in such a manner that the motor supporting member 98 must not be formed of steel, but may be formed of a elastic member without any problems.

By forming the motor supporting member 98 of the elastic member such as a spring steel or a hard rubber, vibrations of the electrically-driven motor 96 can be absorbed by the motor supporting member 98. Thus, an additional elastic member is not necessary, whereby the cost can be reduced.

The present invention is fourthly characterized in that the motor supporting member 98 is a cross member for connecting the left and right portions of the vehicle body frame 11, more specifically, of the inclined frames 43, 44.

Since the cross member of the vehicle body frame 11 is employed as the motor supporting member 98, the electrically-driven motor 96 can be firmly supported by the motor supporting member 98, and the repeated load applied to the steering shaft 38 and the power assist unit 83 can further be reduced.

Furthermore, since the motor supporting member 98 serves as the cross member of the vehicle body frame 11, the rigidity of the vehicle body frame 11 can be enhanced, and vibrations of the vehicle body frame 11 can also be reduced.

Figure 5:
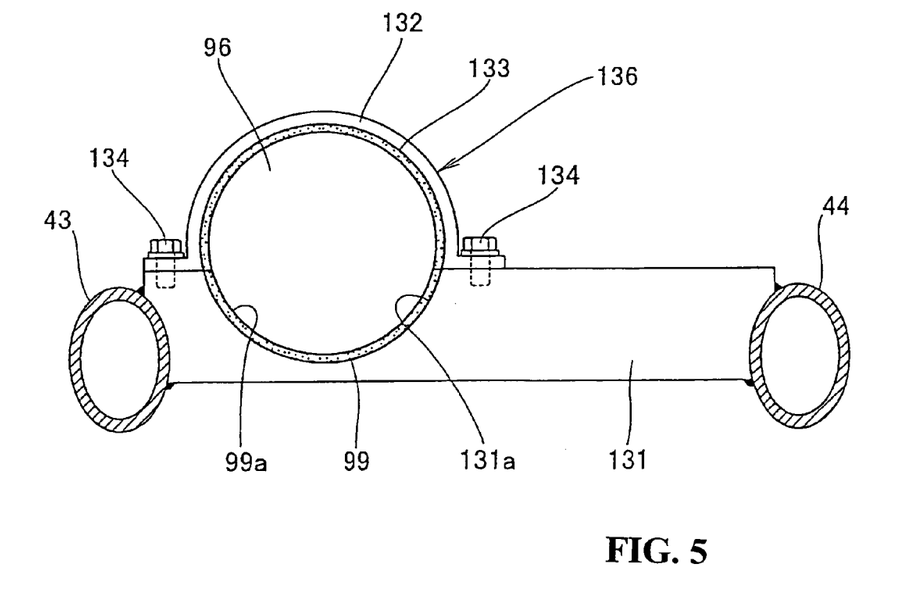
FIG. 5 is a cross-sectional view showing an electrically-driven motor supporting structure according to a second embodiment of the present invention.

FIG. 5 is a cross-sectional view showing the electrically-driven motor supporting structure according to a second embodiment of the present invention, wherein the rear end portion of the electrically-driven motor 96 is elastically supported by hanging a lower motor supporting member 131 across the left and right inclined frames 43, 44, adhering the rubber 99 to an arcuate recess 131a formed on the lower motor supporting member 131, placing the rear end portion of the electrically-driven motor 96 on the recess 99*a* formed by the rubber 99, while adhering a rubber 133 on an inner surface of a band member 132 formed substantially into an omega shape, and attaching both ends of the band member 132 to the lower motor supporting member 131 with bolts 134, 134.

The lower motor supporting member 131, the band member 132, and the bolts 134, 134 are members which constitute a motor supporting member 136.

In this manner, by supporting the electrically-driven motor 96 by the motor supporting member 136 via the rubbers 99, 133, the electrically-driven motor 96 can be supported further reliably in the horizontal direction and the vertical direction.

The present invention is fifthly characterized in that the motor supporting member 136 is configured by tightening the lower motor supporting member 131 for supporting the lower portion of the end portion of the electrically-driven motor 96 and the band member 132 as the upper motor supporting member for supporting the upper portion of the end portion of the electrically-driven motor 96 with the bolts 134.

The electrically-driven motor 96 can be supported more firmly by the motor supporting member 136 including the lower motor supporting member 131 and the band member 132, and the repeated load applied to the steering shaft 38 (see FIG. 2) and the power assist unit 83 (see FIG. 2) can be further reduced.

Figure 6:
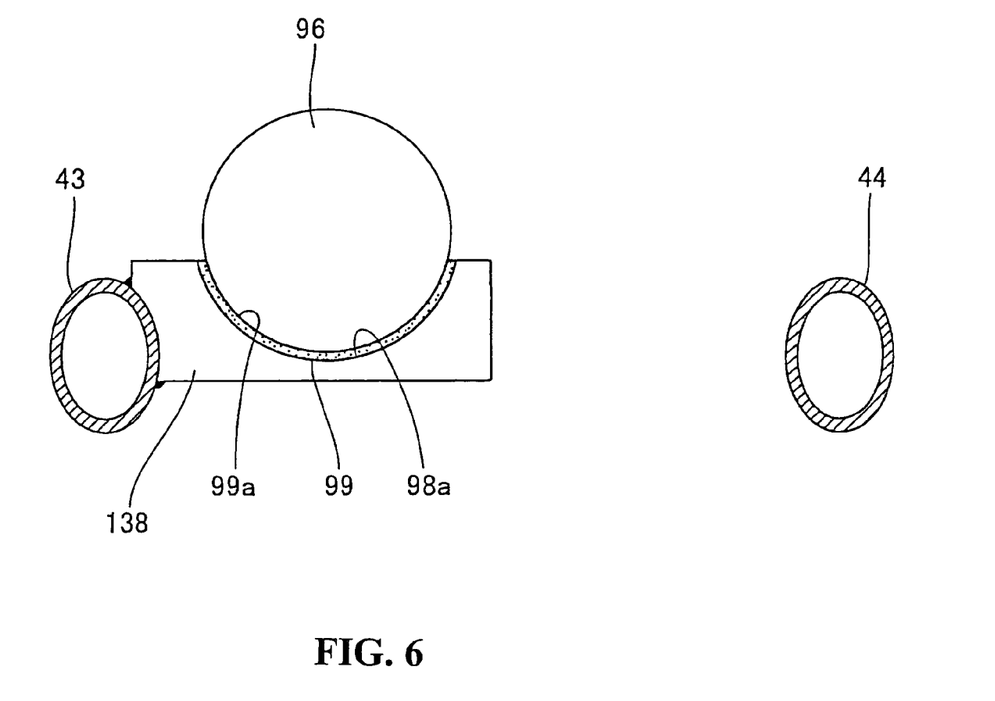
FIG. 6 is a cross-sectional view showing the electrically-driven motor supporting structure according to a third embodiment of the present invention.

FIG. 6 is a cross-sectional view showing the electrically-driven motor supporting structure according to a third embodiment of the present invention, wherein the rear end portion of the electrically-driven motor 96 is elastically supported by mounting the motor supporting member 133 to one of the left and right inclined frames 43, 44, in this case, the inclined frame 43 so as to extend toward the other inclined frame 44, adhering the rubber 99 to an arcuate shaped recess 138*a* formed on the motor supporting member 138, and placing the rear end portion of the electrically-driven motor 96 on the recess 99*a* formed by the rubber 99.

In this manner, by configuring the motor supporting member 138 into a cantilevered structure, the length of the motor supporting member 138 can be reduced, and the weight can also be reduced. Since the motor supporting member 138 is mounted only to the inclined frame 43, the flexibility of the vehicle body frame 11 can be maintained without increasing the rigidity, in particular, torsional rigidity of the vehicle body frame 11 (see FIG. 2) significantly.

In this manner, the present invention is sixthly characterized in that a cantilevered member extending inwardly of the vehicle body from any one of the inclined frames 43, 44 as the left and right vehicle body frames is employed as the motor supporting member 138.

By employing the cantilevered member as the motor supporting member 138, the weight of the motor supporting member 138 can be reduced. Thus, the flexibility of the vehicle body frame 11 can be maintained without increasing the rigidity, in particular, torsional rigidity of the vehicle body frame 11 (see FIG. 2) significantly when the motor supporting member 138 is mounted to the inclined frame 43 or the inclined frame 44.

In the present embodiment, the arcuate recess 98*a* is formed on the motor supporting member 98 and the arcuate recess 131*a* is formed on the lower motor supporting member 131 as shown in FIG. 4 and FIG. 5. However, the present invention is not limited thereto, and the electrically-driven motor 96 can be supported by the motor supporting member via a rubber by forming a circular hole on the motor supporting member and inserting the rear end portion of the electrically-driven motor 96 thereto.

The band member 132 shown in FIG. 5 may be a elastic member. In this arrangement, the rubber 133 can be omitted.

The present invention is suitable for a rough terrain vehicle provided with an electrically-driven power steering apparatus.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A rough terrain vehicle comprising:
an actuator unit which constitutes an electrically-driven power steering apparatus provided coaxially with a steering shaft, and
an electrically-driven motor provided in the actuator unit arranged so as to be orthogonal to the steering shaft and extend in a rearward direction,
an end portion of the electrically-driven motor being supported by a motor supporting member mounted to a vehicle body frame, wherein the motor supporting member is configured by tightening a lower motor supporting member for supporting a lower portion of the end portion of the electrically-driven motor, and an upper motor supporting member for supporting an upper portion of then end portion of the electrically-driven motor.

2. The rough terrain vehicle provided with an electrically-driven power steering apparatus according to claim 1, wherein the electrically-driven motor is supported by the motor supporting member via an elastic member.

3. The rough terrain vehicle provided with an electrically-driven power steering apparatus according to claim 1, wherein the motor supporting member is formed of an elastic member.

4. The rough terrain vehicle provided with an electrically-driven power steering apparatus according to claim 1, wherein a cross member for connecting left and right portions of the vehicle body frame is employed as the motor supporting member.

5. The rough terrain vehicle provided with an electrically-driven power steering apparatus according to claim 2, wherein a cross member for connecting left and right portions of the vehicle body frame is employed as the motor supporting member.

6. The rough terrain vehicle provided with an electrically-driven power steering apparatus according to claim 5, wherein a cantilevered member extending inwardly of the vehicle body from at least one of the left and right vehicle body frames is employed as the motor supporting member.

7. The rough terrain vehicle provided with an electrically-driven power steering apparatus according to claim 2, wherein a cantilevered member extending inwardly of the vehicle body from at least one of the left and right vehicle body frames is employed as the motor supporting member.

8. The rough terrain vehicle provided with an electrically-driven power steering apparatus according to claim 3, wherein a cantilevered member extending inwardly of the vehicle body from at least one of the left and right vehicle body frames is employed as the motor supporting member.

9. The rough terrain vehicle provided with an electrically-driven power steering apparatus according to claim 1, wherein a cantilevered member extending inwardly of the vehicle body from at least one of the left and right vehicle body frames is employed as the motor supporting member.

10. The rough terrain vehicle provided with an electrically-driven power steering apparatus according to claim 1, further comprising:
an arcuate recess in the motor supporting member; and
rubber placed in the recess, the rear end of the electrically-driven motor placed in the recess.

11. A support for use with a rough terrain vehicle provided with an electrically-driven motor, comprising:
an actuator unit including an electrically-driven power steering apparatus provided coaxially with a steering shaft;
an electrically-driven motor provided in the actuator unit orthogonally arranged relative to the steering shaft; and
a motor supporting member for supporting the electrically-driven motor to a vehicle body frame comprising first and second motor supporting members, wherein the motor supporting member is configured by tightening the first motor supporting member for supporting a lower portion of the end portion of the electrically-driven motor, and the second motor supporting member for supporting an upper portion of the end portion of the electrically-driven motor.

12. The support for use with a rough terrain vehicle provided with an electrically-driven power steering apparatus according to claim 11, wherein the electrically-driven motor is supported by the motor supporting member via an elastic member.

13. The support for use with a rough terrain vehicle provided with an electrically-driven power steering apparatus according to claim 12, wherein a cross member for connecting left and right portions of the vehicle body frame is employed as the first motor supporting member.

14. The support for use with a rough terrain vehicle provided with an electrically-driven power steering apparatus according to claim 11, wherein the motor supporting member is formed of an elastic member.

15. The support for use with a rough terrain vehicle provided with an electrically-driven power steering apparatus according to claim 11, wherein a cross member for connecting left and right portions of the vehicle body frame is employed as the first motor supporting member.

16. The rough terrain vehicle provided with an electrically-driven power steering apparatus according to claim 11, further comprising:
an arcuate recess in the motor supporting member; and
rubber placed in the recess, the rear end of the electrically-driven motor placed in the recess.

* * * * *